Patented Oct. 28, 1930

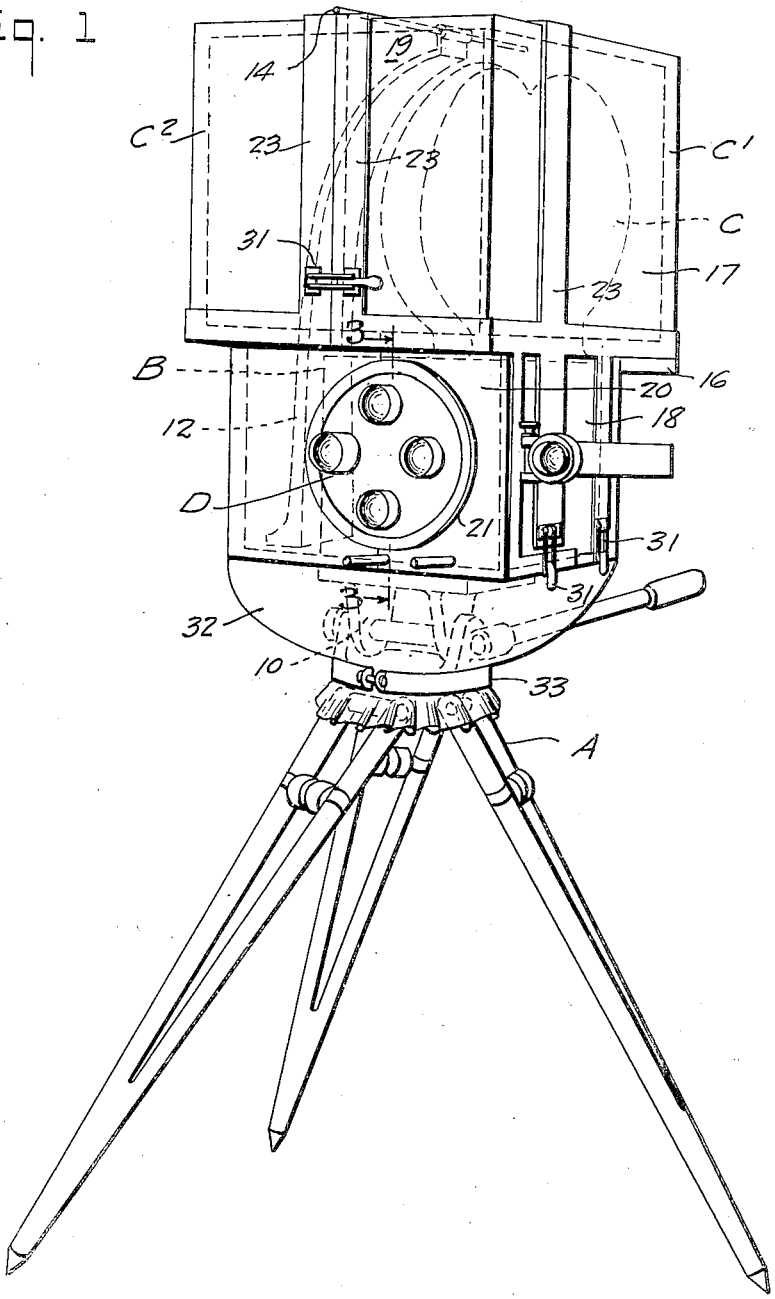

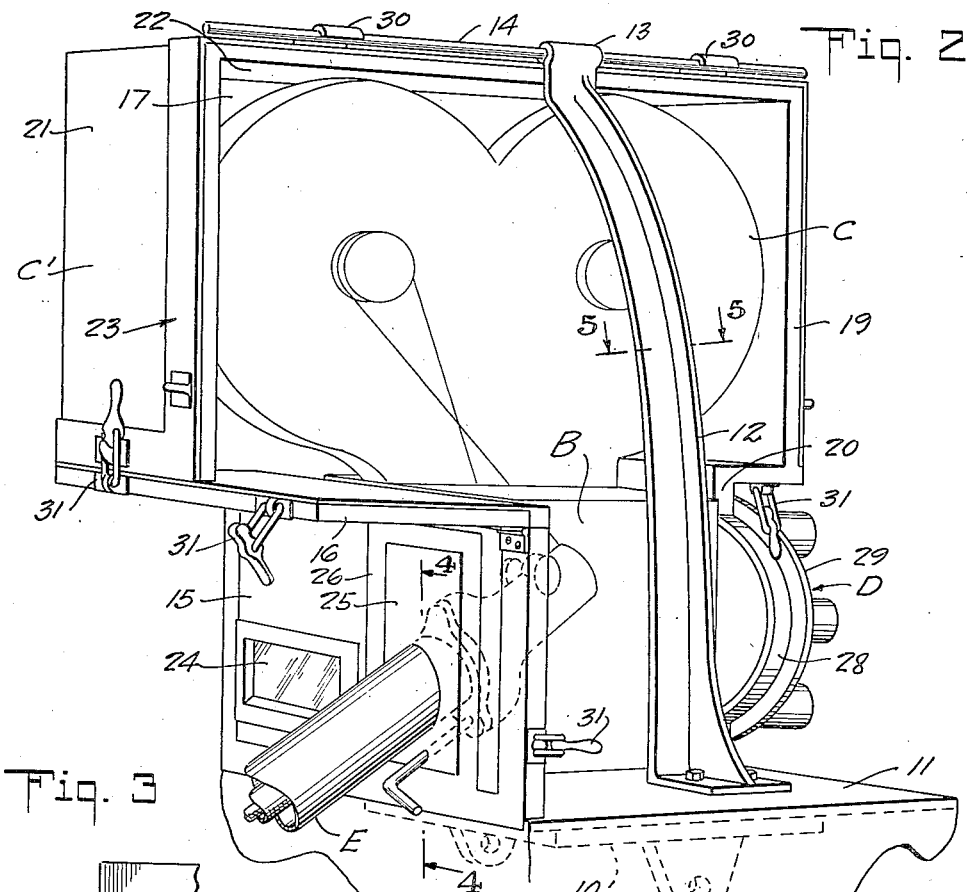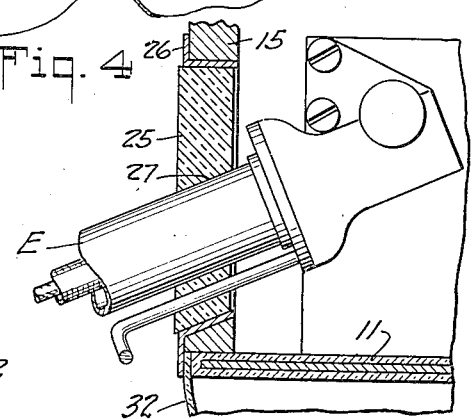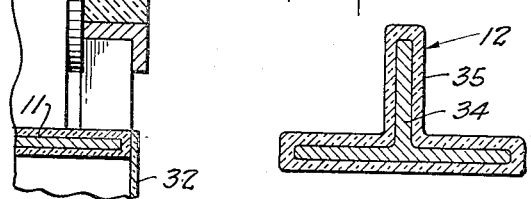

1,779,653

UNITED STATES PATENT OFFICE

GEORGE NORMAN BALL, OF GLENDALE, CALIFORNIA, ASSIGNOR TO WARNER BROS. PICTURES, INC., OF LOS ANGELES, CALIFORNIA, A CORPORATION

SOUND-INSULATED CAMERA       REISSUED

Application filed June 3, 1929. Serial No. 367,909.

This invention relates to a motion picture camera having a sound insulating housing. In the production of motion pictures with accompanying acoustic records, it is necessary to protect the sound receptive devices for making the sound records from extraneous and foreign sounds. The action is commonly photographed simultaneously with the recording of the sound. It is necessary to operate the sound recording mechanism and the camera in synchronism. Thus, in addition to the noise of operation of the camera proper, there are other noises resultant from the power transmitting mechanism of the camera.

It is the primary object of this invention to provide sound insulating shields for the camera and associated parts. It is a further object of this invention to provide a sound shield of the character described which provides for easy access to the camera reels and other parts; and it is a still further object of this invention to provide shields easy of assembly and disassembly.

These objects together with other objects and corresponding accomplishments are obtained by means of the embodiment of my invention illustrated in the accompanying drawings, in which:—

Fig. 1 is a perspective view of a complete camera equipped with my improved sound insulating housing; Fig. 2 is a perspective view showing a part of the housing removed; Fig. 3 is an elevation of a fragment of the housing as seen on plane 3—3 of Fig. 1 with the lens turret in section; Fig. 4 is a vertical section through a fragment of the housing and the propeller shaft panel as seen on plane 4—4 of Fig. 2; Fig. 5 is a cross section through the standard as seen on the line 5—5 of Fig. 2.

Referring with more particularity to the drawings, a standard camera is shown mounted upon a tripod A, the camera comprising a camera box B upon which is mounted a reel magazine C. The lens is indicated by D and a propeller shaft and conduit housing therefor is marked E.

The tripod is provided with an adjustment head 10 supporting a base 11. The base forms the bottom of the sound casing and extends beyond the camera box B to form a lateral shelf supporting a standard 12. The standard overhangs the camera side wall and has an eye 13 supporting a rod 14.

The camera box is enclosed partly by a rear wall 15 formed of insulating material, to which is hinged an outstanding wall 16. The reel magazine is covered by a longitudinally divided shield box, the line of division being substantially medial, that is, at the shelf side wall of the camera box. It comprises two sections $C^1$ and $C^2$. These sections are substantially alike. Section $C^1$ comprises a side wall 17 with a dependent extension 18 to form a side wall for the camera box shield. A front wall 19 has an underhanging portion 20 with a semi-circular recess 21 for accommodating the lens turret D. A rear wall 21 is adapted to meet hinged wall 16. A top wall 22 completes section $C^1$. This section is integral and is preferably formed of sponge rubber with a wooden frame work for stiffening. The frame work is indicated generally by 23. Section $C^2$ is similarly constructed. It will be noted from an inspection of Fig. 1 that the junction line between wall 20 and the corresponding wall is not exactly at the center of the camera front. This is because the turret is not at the center. The rear wall 15 is provided with a window 24 and a panel opening to receive a detachable panel 25 of sponge rubber stiffened by a metallic frame 26. An opening 27 for passage of the conduit housing on the propeller shaft is provided. The lens turret has a sponge rubber disk 28 with a stiffening ring of metal 29. At the top walls of the magazine shield are hooks 30 to engage rod 14. These hooks are so arranged as to be slipped over rod 14 and also to serve as hinges whereby to swing the sections $C^1$ and $C^2$ outwardly to expose the camera box and mechanism. Clasps 31 are provided to fasten the sections of the casing together. Depending from the base 11 is an apron 32 preferably formed of rubber sheeting. This may be gathered together about the tripod head and held by a split clamp ring 33 so as to envelope the head. It will be noted from Fig. 5 that the standard 12 has a body 34 of metal of T shape and is covered by rubber 35 so as to deaden the sound carrying character of the standard.

The assembly of the casing is obvious. To gain access to either side of the camera the clasps connecting the sections of the shield box section to the remaining portions are unfastened. The section may then be swung about rod 14 or removed, if desired.

What I claim is:—

1. A motion picture camera structure having a camera and a base plate, a standard upstanding from the base plate, a rod extending from the upper end of said standard longitudinally of said camera: a casing having sound proof walls to encompass said camera comprising a longitudinally divided sound shield box to cover said reel magazine and having a top wall, the juncture of the divisions of said top wall meeting at said rod, hooks on said top wall to engage said rod and hold the box sections in place, and clasps to secure the sections of said box together.

2. A motion picture camera structure having a camera provided with a lens turret and a base plate, a standard upstanding from the base plate, a rod extending from the upper end of said standard longitudinally of said camera: a casing having sound proof walls to encompass said camera comprising a longitudinally divided sound shield box to cover said reel magazine including front and side walls and a top wall, the juncture of the divisions of said top wall meeting at said rod, hooks on the divisions of said top wall to engage said rod and hold the box sections in place, registering semi-circular recesses in the adjoining edges of the front walls of said sound shield box to accommodate said turret, and clasps to secure said sections together.

3. A motion picture camera structure having a camera box, a reel magazine mounted on the top thereof, a base plate, a standard upstanding from the base plate, a rod extending from the upper end of said standard longitudinally of said camera box: a casing having sound proof walls to encompass said camera box and reel magazine comprising a rear wall, a longitudinally divided sound shield box to cover said reel magazine and having a top wall, the juncture of the divisions of said top wall meeting at said rod, hooks on the divisions of said top wall to engage said rod and hold the sound shield box sections in place, the sections of said sound shield box having depending side and front walls for said camera box to join with said rear wall, and clasps to secure the sections of said sound shield box and said rear wall together.

4. A motion picture camera having a camera box, a reel magazine mounted on the top thereof, a base plate extending to one side of said camera box to provide a shelf, a lens turret on said camera box, a standard upstanding from said shelf, a rod extending from the upper end of said standard longitudinally of said camera box: a casing having sound proof walls comprising a rear wall for the camera box, a longitudinally divided sound shield box for mounting on said base plate to cover said reel magazine and having a top wall, the juncture of the divisions of said top wall meeting at said rod, hooks on the divisions of said top wall to engage said rod and hold the sound shield box sections in place, said sound shield box including depending front and side wall portions to complete the lateral enclosure of said camera box, semi-circular recesses in the adjoining front wall portions to encompass the base of said lens turret, and clasps to secure the walls of said shield box to said casing and thereby to hold the sections of said box together.

5. A motion picture camera having a camera box, a reel magazine mounted on the top thereof, a base plate, a standard upstanding from said base plate, a sound proof conduit covered propeller shaft, a rod extending from the upper end of said standard longitudinally of said camera box: a casing having sound proof walls to encompass said camera box and reel magazine comprising a rear wall, a longitudinally divided sound shield box to cover said reel magazine and having a top wall, the juncture of the divisions of said top wall meeting at said rod, hooks on the divisions of said top wall to engage said rod and hold the sound shield box sections in place, the sections of said sound shield box having depending side and front walls for said camera box to join with said rear wall, a removable sound proof panel in said rear wall for passage therethrough of said propeller shaft, and clasps to secure the sections of said sound shield box and said rear wall together.

6. A motion picture camera having a camera box, a reel magazine mounted on the top thereof, a base plate extending to one side of said camera box to provide a shelf, a lens turret on said camera box, a sound proof conduit covered propeller shaft, a standard upstanding from said shelf, a rod extending from the upper end of said standard longitudinally of said camera box: a casing having sound proof walls comprising a rear wall for the camera box, a longitudinally divided sound shield box for mounting on said base plate to cover said reel magazine and having a top wall, the juncture of the divisions of said top wall meeting at said rod, hooks on the divisions of said top wall to engage said rod and hold the sound shield box sections in place, said sound shield box including depending front and side wall portions to complete the lateral enclosure of said camera, semi-circular recesses in the adjoining front wall portions to encompass the base of said lens turret, a removable panel in the rear wall for passage therethrough of said propeller shaft, and clasps to secure the walls of said shield box to said casing and thereby to hold sections of said box together.

7. A motion picture camera having a camera box, a reel magazine mounted on the top thereof, a base plate extending to one side of said camera box to provide a shelf, a standard upstanding from said shelf, a rod extending from the upper end of said standard longitudinally of said camera box: a casing having sound proof walls comprising a rear wall for the camera box, a hinged wall outstanding from said rear wall, a longitudinally divided sound shield box mounted on said base to encompass said reel magazine and having a top wall, the juncture of the divisions of said top wall meeting at said rod, hooks on the divisions of said top wall to engage said rod and hold the sound shield box sections in place, the sound shield box sections including depending side and front wall portions to complete the lateral enclosure of said camera box and rear wall portions to join said outstanding wall, and clasps to secure the sections of said shield box to said base and to said outstanding wall.

8. A motion picture camera having a camera box, a reel magazine mounted on the top thereof, a lens turret for said camera box, a base plate extending to one side of said camera box to provide a shelf, a standard upstanding from said shelf, a rod extending from the upper end of said standard longitudinally of said camera box: a casing having sound proof walls comprising a rear wall for the camera box, a hinged wall outstanding from said rear wall, a longitudinally divided sound shield box for mounting on said base to encompass said reel magazine and having a top wall, the juncture of the divisions of said top wall meeting at said rod, hooks on the divisions of said top wall to engage said rod and hold the sound shield box sections in place, the sound shield box sections including depending side and front wall portions to complete the lateral enclosure of said camera box and rear wall portions to join said outstanding wall, registering semi-circular recesses in the adjoining edges of said front wall portions for accommodation of said lens turret, and clasps to secure the sections of said shield box to said base and to said outstanding wall.

9. A motion picture camera having a camera box, a reel magazine mounted on the top thereof, a base plate extending to one side of said camera box to provide a shelf, a standard upstanding from said shelf, a rod extending from the upper end of said standard longitudinally of said camera box; a casing having sound proof walls comprising a rear wall for the camera box, a hinged wall outstanding from said rear wall, a longitudinally divided sound shield box for mounting on said base to encompass said reel magazine and having a top wall, the juncture of the divisions of said top wall meeting at said rod, hooks on the divisions of said top wall to engage said rod and hold the sound shield box sections in place, the sound shield box sections including depending side and front wall portions to complete the lateral enclosure of said camera box and rear wall portions to join said outstanding wall, a removable panel in said rear wall having an opening for the passage therethrough of said propeller shaft, and clasps to secure the sections of said shield box to said base and to said outstanding wall.

10. A motion picture camera having a camera box, a reel magazine mounted on the top thereof, a lens turret for said camera box, a base plate extending to one side of said camera box to provide a shelf, a standard upstanding from said shelf, a rod extending from the upper end of said standard longitudinally of said camera box; a casing having sound proof walls comprising a rear wall for the camera box, a hinged wall outstanding from said rear wall, a longitudinally divided sound shield box for mounting on said base to encompass said reel magazine and having a top wall, the juncture of the divisions of said top wall meeting at said rod, hooks on the divisions of said top wall to engage said rod and hold the sound shield box sections in place, the sound shield box sections including depending side and front wall portions to complete the lateral enclosure of said camera box and rear wall portions to join said outstanding wall, recesses in the adjoining edges of said front wall portions for accommodation of said lens turret, a removable panel in said rear wall having an opening for the passage therethrough of said propeller shaft, and clasps to secure the sections of said shield box to said base and to said outstanding wall.

11. A motion picture camera structure having a camera and a base plate, a standard upstanding from the base plate, a rod extending from the upper end of said standard longitudinally of said camera; a casing having sound proof walls to encompass said camera comprising a longitudinally divided sound shield box to cover said reel magazine and having a top wall, the juncture of the divisions of said top wall meeting at said rod, hooks on said top wall to engage said rod and hold the box sections in place, clasps to secure the sections of said box together, and an apron of flexible sound proof fabric depending from said base and adapted to envelope the head of a tripod.

12. A motion picture camera structure having a camera provided with a lens turret and a base plate, a standard upstanding from the base plate, a rod extending from the upper end of said standard longitudinally of said camera: a casing having sound proof walls to encompass said camera comprising a longitudinally divided sound shield box to cover said reel magazine including front and side walls and a top wall, the juncture of the divisions of said top wall meeting at said rod, hooks on the divisions of said top wall to engage said rod and hold the box sections in place, registering semi-circular recesses in the adjoining edges of the front walls of said sound shield box to accommodate said turret, clasps to secure the sections of said box together, and an apron of flexible sound proof fabric depending from said base and adapted to envelope the head of a tripod.

13. A motion picture camera structure having a camera box, a reel magazine mounted on the top thereof, a base plate, a standard upstanding from the base plate, a rod extending from the upper end of said standard longitudinally of said camera box: a casing having sound proof walls to encompass said camera box and reel magazine comprising a rear wall, a longitudinally divided sound shield box to cover said reel magazine and having a top wall, the juncture of the divisions of said top wall meeting at said rod, hooks on the divisions of said top wall to engage said rod and hold the sound shield box sections in place, the sections of said sound shield box having depending side and front walls for said camera box to join with said rear wall, clasps to secure the sections of said sound shield box and said rear wall together, and an apron of flexible sound proof fabric depending from said base and adapted to envelope the head of a tripod.

14. A motion picture camera having a camera box, a reel magazine mounted on the top thereof, a base plate extending to one side of said camera box to provide a shelf, a lens turret on said camera box to provide a shelf, a standard upstanding from said shelf, a rod extending from the upper end of said standard longitudinally of said camera box: a casing having sound proof walls comprising a rear wall for the camera box, a longitudinally divided sound shield box for mounting on said base plate to cover said reel magazine and having a top wall, the juncture of the divisions of said top wall meeting at said rod, hooks on the divisions of said top wall to engage said rod and hold the sound shield box sections in place, said sound shield box including depending front and side wall portions to complete the lateral enclosure of said camera box, semi-circular recesses in the adjoining front wall portions to encompass the base of said lens turret, clasps to secure the walls of said shield box to said casing and thereby to hold the sections of said box together, and an apron of flexible sound proof fabric depending from said base and adapted to envelope the head of a tripod.

15. A motion picture camera having a camera box, a reel magazine mounted on the top thereof, a base plate, a standard upstanding from said base plate, a sound proof conduit covered propeller shaft, a rod extending from the upper end of said standard lontudinally of said camera box: a casing having sound proof conduit covered propeller shaft, a rod extending from the upper end of said standard longitudinally of said camera box: a casing having sound proof walls to encompass said camera box and reel magazine comprising a rear wall, a longitudinally divided sound shield box to cover said reel magazine and having a top wall, the juncture of the divisions of said top wall meeting at said rod, hooks on the divisions of said top wall to engage said rod and hold the sound shield box sections in place, the sections of said sound shield box having depending side and front walls for said camera box to join with said rear wall, a removable sound proof panel in said rear wall for passage therethrough of said propeller shaft, clasps to secure the sections of said sound shield box and said rear wall together, and an apron of flexible sound proof fabric depending from said base and adapted to envelope the head of a tripod.

16. A motion picture camera having a camera box, a reel magazine mounted on the top thereof, a base plate extending to one side of said camera box to provide a shelf, a lens turret on said camera box, a sound proof conduit covered propeller shaft, a standard upstanding from said shelf, a rod extending from the upper end of said standard longitudinally of said camera box: a casing having sound proof walls comprising a rear wall for the camera box, a longitudinally divided sound shield box for mounting on said base plate to cover said reel magazine and having a top wall, the juncture of the divisions of said top wall meeting at said rod, hooks on the divisions of said top wall to engage said rod and hold the sound shield box sections in place, said sound shield box including depending front and side wall portions to complete the lateral enclosure of said camera, semi-circular recesses in the adjoining front wall portions to encompass the base of said lens turret, a removable panel in the rear wall for passage therethrough of said propeller shaft, clasps to secure the walls of said shield box to said casing and thereby to hold sections of said box together, and an apron of flexible sound proof fabric depending from said base and adapted to envelope the head of a tripod.

17. A motion picture camera having a camera box, a reel magazine mounted on the top thereof, a base plate extending to one side of said camera box to provide a shelf, a standard upstanding from said shelf, a rod extending from the upper end of said standard longitudinally of said camera box: a casing having sound proof walls comprising a rear wall for the camera box, a hinged wall outstanding from said rear wall, a longitudinally divided sound shield box mounted on said base to encompass said reel magazine and having a top wall, the juncture of the divisions of said top wall meeting at said rod, hooks on the divisions of said top wall to engage said rod and hold the sound shield box sections in place, the sound shield box sections including depending side and front wall portions to complete the lateral enclosure of said camera box and rear wall portions to join said outstanding wall, clasps to secure the sections of said shield box to said base and to said outstanding wall, and an apron of flexible sound proof fabric depending from said base and adapted to envelope the head of a tripod.

18. A motion picture camera having a camera box, a reel magazine mounted on the top thereof, a lens turret for said camera box, a base plate extending to one side of said camera box to provide a shelf, a standard upstanding from said shelf, a rod extending from the upper end of said standard longitudinally of said camera box: a casing having sound proof walls comprising a rear wall for the camera box, a hinged wall outstanding from said rear wall, a longitudinally divided sound shield box for mounting on said base to encompass said reel magazine and having a top wall, the juncture of the divisions of said top wall meeting at said rod, hooks on the divisions of said top wall to engage said rod and hold the sound shield box sections in place, the sound shield box sections including depending side and front wall portions to complete the lateral enclosure of said camera box and rear wall portions to join said outstanding wall, registering semi-circular recesses in the adjoining edges of said front wall portions for accommodation of said lens turret, clasps to secure the sections of said shield box to said base and to said outstanding wall, and an apron of flexible sound proof fabric depending from said base and adapted to envelope the head of a tripod.

19. A motion picture camera having a camera box, a reel magazine mounted on the top thereof, a base plate extending to one side of said camera box to provide a shelf, a standard upstanding from said shelf, a rod extending from the upper end of said standard longitudinally of said camera box: a casing having sound proof walls comprising a rear wall for the camera box, a hinged wall outstanding from said rear wall, a longitudinally divided sound shield box for mounting on said base to encompass said reel magazine and having a top wall, the juncture of the divisions of said top wall meeting at said rod, hooks on the divisions of said top wall to engage said rod and hold the sound shield box sections in place, the sound shield box sections including depending side and front wall portions to complete the lateral enclosure of said camera box and rear wall portions to join said outstanding wall, a removable panel in said rear wall having an opening for the passage therethrough of said propeller shaft, clasps to secure the sections of said shield box to said base and to said outstanding wall, and an apron of flexible sound proof fabric depending from said base and adapted to envelope the head of a tripod.

20. A motion picture camera having a camera box, a reel magazine mounted on the top thereof, a lens turret for said camera box, a base plate extending to one side of said camera box to provide a shelf, a standard upstanding from said shelf, a rod extending from the upper end of said standard longitudinally of said camera box: a casing having sound proof walls comprising a rear wall for the camera box, a hinged wall outstanding from said rear wall, a longitudinally divided sound shield box for mounting on said base to encompass said reel magazine and having a top wall, the juncture of the divisions of said top wall meeting at said rod, hooks on the divisions of said top wall to engage said rod and hold the sound shield box sections in place, the sound shield box sections including depending side and front wall portions to joint said outstanding wall, recesses in the adjoining edges of said front wall portions for accommodation of said lens turret, a removable panel in said rear wall having an opening for the passage therethrough of said propeller shaft, clasps to secure the sections of said shield box to said base and to said outstanding wall, and an apron of flexible sound proof fabric depending from said base and adapted to envelope the head of a tripod.

In witness that I claim the foregoing I have hereunto subscribed my name this 25th day of May, 1929.

GEORGE NORMAN BALL.